(12) United States Patent
Krigel

(10) Patent No.: US 6,791,336 B2
(45) Date of Patent: Sep. 14, 2004

(54) APPARATUS AND METHOD FOR VALIDATING WIRING DIAGRAMS AND CREATING WIRELISTS

(76) Inventor: H. Youval Krigel, 4703 Shavano Oak, San Antonio, TX (US) 78249

( * ) Notice: Subject to any disclaimer, the term of this patent is extended or adjusted under 35 U.S.C. 154(b) by 0 days.

(21) Appl. No.: 10/018,642

(22) PCT Filed: Apr. 21, 2001

(86) PCT No.: PCT/US01/12818

§ 371 (c)(1),
(2), (4) Date: Dec. 19, 2001

(87) PCT Pub. No.: WO01/82209

PCT Pub. Date: Nov. 1, 2001

(65) Prior Publication Data

US 2003/0006779 A1 Jan. 9, 2003

Related U.S. Application Data

(60) Provisional application No. 60/198,948, filed on Apr. 21, 2000.

(51) Int. Cl.$^7$ .......................... H01H 31/02; G06F 9/45
(52) U.S. Cl. ........................................... 324/539; 716/5
(58) Field of Search ................................ 324/539, 503; 716/4, 5

(56) References Cited

U.S. PATENT DOCUMENTS

| | | | |
|---|---|---|---|
| 3,370,232 A | 2/1968 | Wickersham | 324/73 |
| 3,699,438 A | 10/1972 | Webb | 324/66 |
| 4,620,282 A | 10/1986 | Shelley | 364/489 |
| 4,959,792 A * | 9/1990 | Sullivan | 702/58 |
| 5,027,074 A | 6/1991 | Haferstat | 324/539 |
| 5,072,185 A * | 12/1991 | Rockwell | 324/539 |
| 5,280,251 A | 1/1994 | Strangio | 324/539 |
| 5,598,342 A | 1/1997 | Siemon et al. | 364/481 |
| 5,852,796 A | 12/1998 | Stepanenko, Jr. | 702/176 |

FOREIGN PATENT DOCUMENTS

| | | | | |
|---|---|---|---|---|
| JP | 406018592 A | 1/1994 | | 324/539 |
| JP | 406258371 A | 9/1994 | | 324/539 |

* cited by examiner

*Primary Examiner*—N. Le
*Assistant Examiner*—Donald M Lair
(74) *Attorney, Agent, or Firm*—Kammer Browning PLLC

(57) ABSTRACT

A portable and easy to use tester for validating the accuracy of wiring diagram manuals and for testing modifications and new installations for proper wiring. The invention also provides an easy way to create a wire list describing all the interconnections between attached connectors. The tester can also be used as a troubleshooting tool without having a previously learned cable reference. The invention further tests wiring insulation in a wiring harness and identifies poor wire to wire and wire to ground insulation. Finally the present invention provides a system for generating a wiring diagram based upon the results of a wiring validation series of checks/tests.

12 Claims, 6 Drawing Sheets

| FROM | ITEM NUMBER | GA | QTY | FR | FT | IC | FE | NHA | REF | PN# | Start SP | End SP | Start TI | End TI | Start PN# | End PN# |
|---|---|---|---|---|---|---|---|---|---|---|---|---|---|---|---|---|
| 123X4567 | X2440-0031 | 24 | | GK | | 643-62-25 | X03875C | D10 | | | | | X04587B | 12 | | |
| 123X4567 | X2440-0032 | 22 | | GA | 12 | 643-62-25 | X03875C | D13 | | | | | X04587B | 16 | | |
| 123X4567 | X2440-0033 | 22 | | GA | 11 | 643-62-25 | Y00356D | D22 | | | | | Y02586D | 18 | | |
| 286N1330 | W1330-0055 | 22 | | GA | 1 | 1121-61-51 | D02558C | 4 | | | | | GD03366 | AC | | 2 |
| 286N1330 | W1330-0056 | 24 | | GK | 2 | 621-61-51 | D02558B | 2 | | | | | D40846J | 3 | | |
| 286N1330 | W1330-0057 | 24 | | GK | 2 | 821-61-51 | D02558A | C03 | | | | | D40846J | 16 | | |
| 286N1330 | W1330-0058 | 22 | | GA | 2 | 221-61-51 | D02558A | C15 | | | | | GD03366 | DC | | 2 |
| 286N1330 | W1330-0059 | 24 | | GK | 3 | 021-51-14 | D04130A | C15 | | | | | GD03366 | AC | | 2 |
| 286N1330 | W1330-0060 | 24 | | GK | 3 | 021-51-14 | D04130A | B14 | | | | | GD03366 | DC | | 2 |
| 286N1330 | W1330-0061 | 24 | | GK | 2 | 921-51-14 | D04130C | 3 | | | | | GD03366 | ST | | 2 |
| 286N1330 | W1330-0062 | 22 | | GA | 1 | 1121-61-51 | D02558C | 3 | | | | | GD03366 | ST | | 2 |
| 286N1330 | W1330-0171 | 24 | | GK | 2 | 321-51-14 | D04130A | A15 | | | | | D40656J | 12 | | |
| 286N1330 | W1330-2001B | 24 | | GL | DA | 2 | D02964B | B02 | | | | | D40656J | 11 | | |
| 286N1330 | W1330-2001R | 24 | | GL | DA | 0 | D02964B | B01 | | | | | D40656J | 10 | | |
| 286N1330 | W1330-2002B | 24 | | GL | AG | 2 | D02964B | C01 | | | | | D40656J | 40 | | |

FIG. 5

APPARATUS AND METHOD FOR VALIDATING WIRING DIAGRAMS AND CREATING WIRELISTS

This application claims benefit of provisional application No. 60/198,948 filed Apr. 24, 2000.

BACKGROUND OF THE INVENTION

1. Field of the Invention

The present invention relates to electronic test equipment used to test wires and wiring harnesses.

2. Description of the Related Art

There are few effective systems for validating the integrity and accuracy of a wiring harness based upon an existing wiring diagram or wiring list. Most such systems currently in use are both extremely expensive and complex. Systems capable of verifying continuity in a wiring harness are generally designed to be utilized by at least two technicians positioned at either end of the wiring harness under investigation.

SUMMARY OF THE INVENTION

It is an object of the present invention to provide a novel piece of equipment and method to validate the accuracy of wiring diagram manuals.

It is another object of the present invention to create wire lists.

It is another object of the present invention to provide improved and automatic wiring continuity checks.

It is another object of the present invention to allow a single user to validate accuracy and create wire lists.

It is another object of the present invention to test modifications and new installations.

It is another object of the present invention to provide improved and automatic wiring insulation checks.

It is another object of the present invention to provide a system for improved and automatic wiring continuity checks and generating a wiring diagram reflecting the same.

In satisfaction of these and related objectives, the present invention provides a portable and easy to use tester for validating the accuracy of wiring diagram manuals and for testing modifications and new installations for proper wiring. The invention also provides an easy way to create a wire list describing all the interconnections between attached connectors. The tester can also be used as a troubleshooting tool without having a previously learned cable reference. The invention further tests wiring insulation in a wiring harness and identifies poor wire to wire and wire to ground insulation. Finally the present invention provides a system for generating a wiring diagram based upon the results of a wiring validation series of checks/tests.

BRIEF DESCRIPTION OF THE DRAWINGS

FIG. 5 is an example of the wire list attributes used in the preferred example.

DETAILED DESCRIPTION OF THE PREFERRED EMBODIMENT

Figure 1:
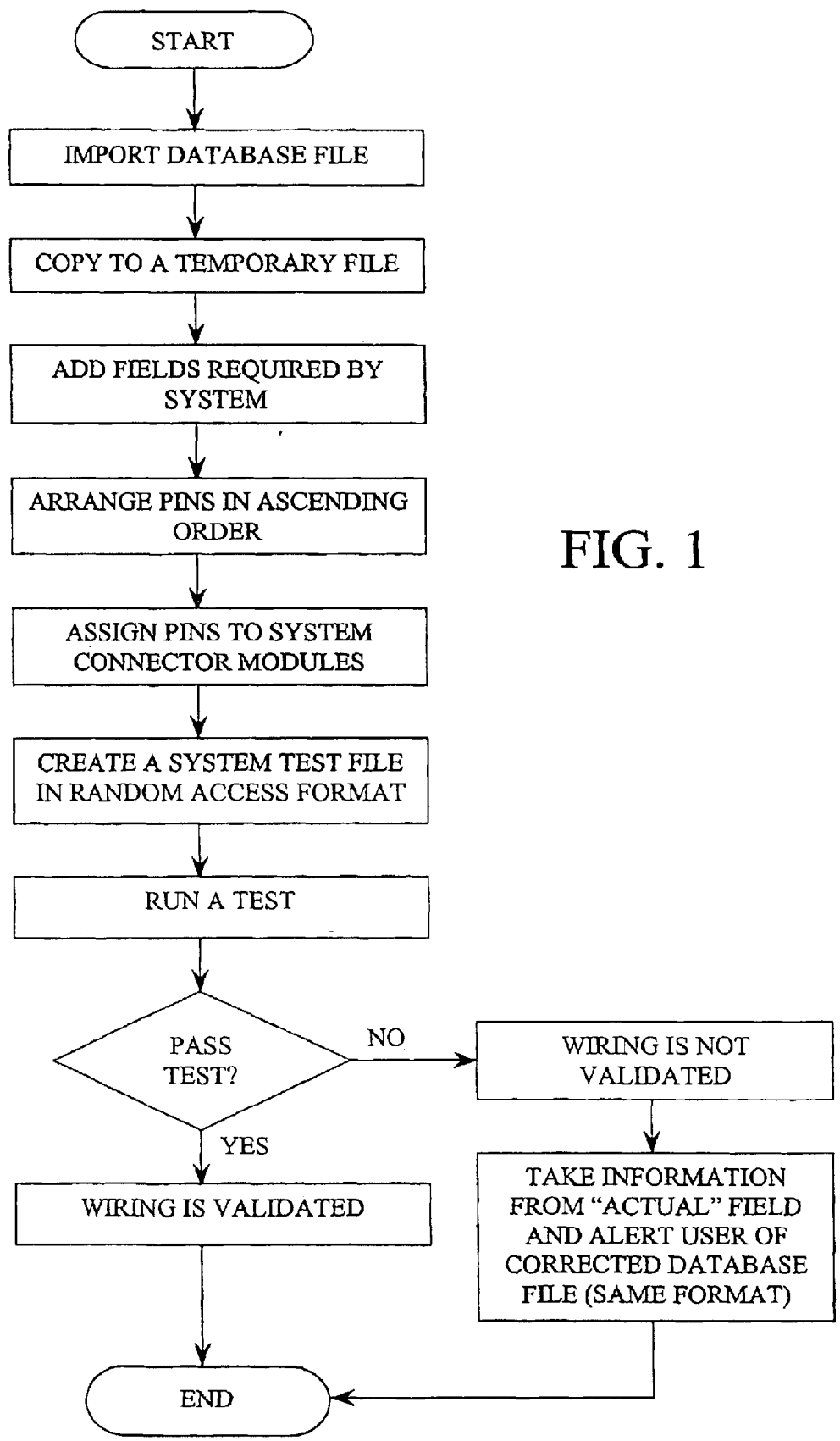
FIG. 1 is a flow chart of the wiring validation process of the preferred embodiment.

The present invention provides an easy to use Windows® based software to validate the accuracy of wiring diagram manuals and wiring diagram drawings. The equipment of the system of the invention will automatically create wire lists, automatically learn wiring configurations, test modifications and new installations, and automatically creates reports in MS Access 97 format. In addition, the system will sense wiring insulation integrity and may interface with computer aided drawing software to generate accurate wiring diagrams. The reports generated will show total cables tested, failed, percentage and creates a summary final acceptance form. The equipment will save files to a computer hard drive and/or floppy disk, read files from computer hard drive, CD-ROM or floppy disk, and import wire list data in MS Access® 97 to be used as a baseline. As a result, the invention improves and automates wiring continuity checks, allows for use by a single technician, and the open architecture design allows system expansion.

The basic operation of the system involves the "learning" of a known good wiring harness, thereby establishing a baseline reference, and thereafter testing the wiring harness against this reference. The system, however, may also be used as a trouble shooting tool without having previously learned cable as a reference. The user can compare the wire list generated by the system and very quickly compare it with the "proper" wire list to identify deviations from the norm.

The primary validation is that of proper connections though additional wiring harness characteristics can be easily acquired by the present system. The properties of the insulation associated with the wiring harness are discernable by varying the interrogating voltage between the wires under test and between any wire and the system ground. The resistivity of the wires within the wiring harness is also discernable with the same basic functional electronic interrogating circuits.

In addition to written reports in the form of wire lists and tables of wiring harness characteristics, the present invention incorporates software features that permit the generation of wiring diagrams based on the stored results of the testing operations carried out.

The goal of the system is to report on the condition of the wiring harness under test. The system generates a number of reports useful to the operator, including:

Pass/Fail Report that identifies the number of wires tested, the number of wires that passed, the number of wires that failed, and the percentage of cables that passed.

Failure Report that responds to queries from the user to identify more specifically the failed elements and their failure parameters.

Wire List Report that may be generated at any point in the process and/or in response to the user selecting a specific part for investigation.

Summary Report that provides in summary form the results of all or a select group of tests carried out over a period of time.

The Circuitry

The connectors of the wiring harness under test are connected to the system connectors. The hardware provides via a switching circuitry a small voltage, typically 1 volt, as stimulus. It then senses the current through the wire and determines if there is a connection. A variable and software controlled reference voltage is used to determine the sensitivity of the test and may be used to find the resistance of the wire. The results for each wire are then stored in the computer memory.

Software algorithms create a wire list, which is the "map" or the diagram of the harness. If the wire list was created from a known good harness, it may be used as a base line reference for testing other wire harnesses from the same type.

Wiring Validation

The main feature of the system of the present invention is its ability to validate the accuracy of wiring diagram manuals. Wiring diagrams of legacy aircraft do not always reflect the actual wiring installed. This may cause difficulties in maintaining and troubleshooting the aircraft. Validating the wiring diagrams using Ohm-meters, requires two technicians, is time consuming and expensive.

Typically, the wiring diagram in a manual is stored in database format and the fields of the database include the part number of the harness, the wire identification, the length, name of start plugs, end plugs, references and more.

The system software can import the original database file i.e. an MS Access 97 database file, and goes through the following process:

1. Copies the original database to a temporary file.
2. Sort it by connector name with the highest pin-count pins within the connectors will be sorted in ascending order.
3. Assign original pin identifications within the connector to system pin identifications.
    Example: 757DM9240 Terminal 10 is assigned to system DM9240 pin 43. Note: If the original pin (terminal) is a character (as aa, b, z) it will translated to a numerical value.
4. Assign modules to above referenced connectors. If more then 32 pins are being examined, combine modules.
5. Create original to system interface diagram.
6. Based on 'Conn1KtestPin7' and 'Conn2KtestPin" (see item 4) it creates a Ktest LEARN format records and save to Ktest random access tile.
7. Run test.
8. Create wire-list database in same format as original. This one will contain actual wire-list.
9. If test fails, it will show the difference between original wire-list and the actual wire-list.

By taking the above steps, the system of the present invention imports the original database with all its fields, (which could also include fields like wire color, gauge, dates and so on).

After the system testing operation, the system will export the same database file structure with all its original fields but with the indication that the wiring was either validated or will show the differences between the imported database and the actual results. Upon request, a corrected database file can be automatically created.

Wire List Process

Figure 2:
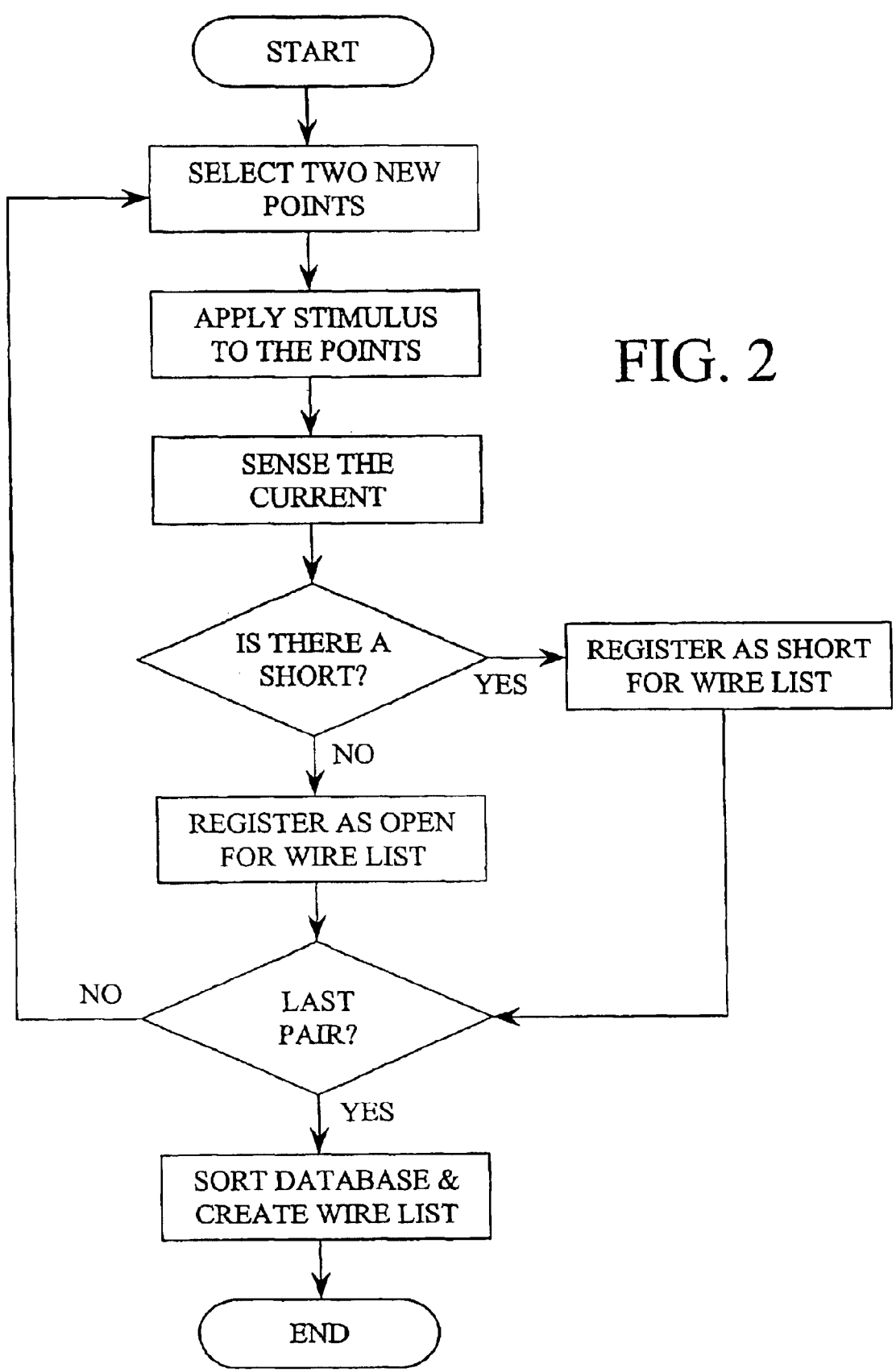
FIG. 2 is a flow chart of the wire list generation process of the preferred embodiment.

Reference is made to FIG. 2 for a brief description of the method for creating a wire list through operation of the system.

1. The controller sends a command to the Driver/Sensor cards to select two wires.
2. The controller gets a voltage level from the Driver/Sensor card which corresponds to the status of the 2 wires (short or open).
3. The system measures the value of Item 2 above, compares it to a set reference and determines the status (short/open).
4. The system stores the status result of the selected two wires in a database and proceeds with the next set of wires.
5. Upon completion selecting and testing all wires connected to the system, the
6. software sorts its database and creates a list of all the wires which were found to be connected to each other.

Validation Process

Reference is made to FIG. 1 for a general description of the validation process of the present invention.

1. A database file containing wiring data is imported into the system Test Import program.
2. The Program, using Visual Basic 5 copies the original file to a temporary file.
3. The program then assigns the database fields required by the system to the temporary database file. These fields are Cable Number 1 Connector 1 Name, Connector 1 Terminal, Connector 2 Name, Connector 2 Terminal.
4. The program counts the number of pins assigned to each Connector, arranges them in ascending order and assigns them to system pin numbers, so they can be accessed by the system controller card.
5. The program then assigns to the connectors the appropriate system connector modules, so for example If the connector has 50 pins, there will be 2 modules assigned.
6. The program reads from the database the records which shows Cable Number, Connector 1 Name, Connector 1 Terminal, Connector 2 Name, Connector 2 Terminal and based on that information which shows which system pin number connects to another system pin number, it creates a system equivalent "learn" file which is structured in the same way as a regular (with no database input) cable under test file.
7. At this point the system is capable of running a regular test on the harness under test.
8. The results of these tests are written back into the records of the database in new added fields which now represent the "actual" Connector 2 Name, and the "actual" Connector 2 Terminal. In other words, new fields to the database were added only to Connector 2 Name, and Connector 2 Terminal because they represent a potential difference to where Connector 1 could actually be connected to.
9. The program compares the "actual" results to the expected results (stored in the old Connector 2 Name, and Connector 2 Terminal). If the results are the same then the wire harness is validated. If they are not the same, the program translates the fields back to the original database format and field names, and provides a new corrected database file for the wire harness. The user gets a corrected database and still retains the information of the other fields not needed by the system (such as wire color, wire gauge etc.). In addition, 2 fields which show differences are added.

Hardware Description

The hardware of the system of the present invention consists of two primary components: the Controller Card which resides inside the IBM PC type computer and the Multiplexer/Driver cards which reside inside the system connector unit and which are controlled by the Controller Card. Standard PC architecture is required for integration and operation of all of the features of the system of the present invention.

The Controller Card:

The Controller card resides inside the IBM PC type computer, connected to the computer bus. The system circuitry is able to select any 2 points of the multiplexer/driver card. Since the wire harness under test is connected directly to the multiplexer/driver card, the controller can select any 2 wires of the harness under test. The process is as following;

1. The controller sends a command to the multiplexer/driver card to select 2 wires.
2. The controller gets a voltage level from the multiplexer/driver card which corresponds to the status of the 2 wires (short or open).
3. The system measures the value of item 2, compares it to a set reference and determines the status (short/open).
4. The system stores the status result of the selected 2 wires and proceeds with the next set of wires.

Hardware Components

Figure 3:
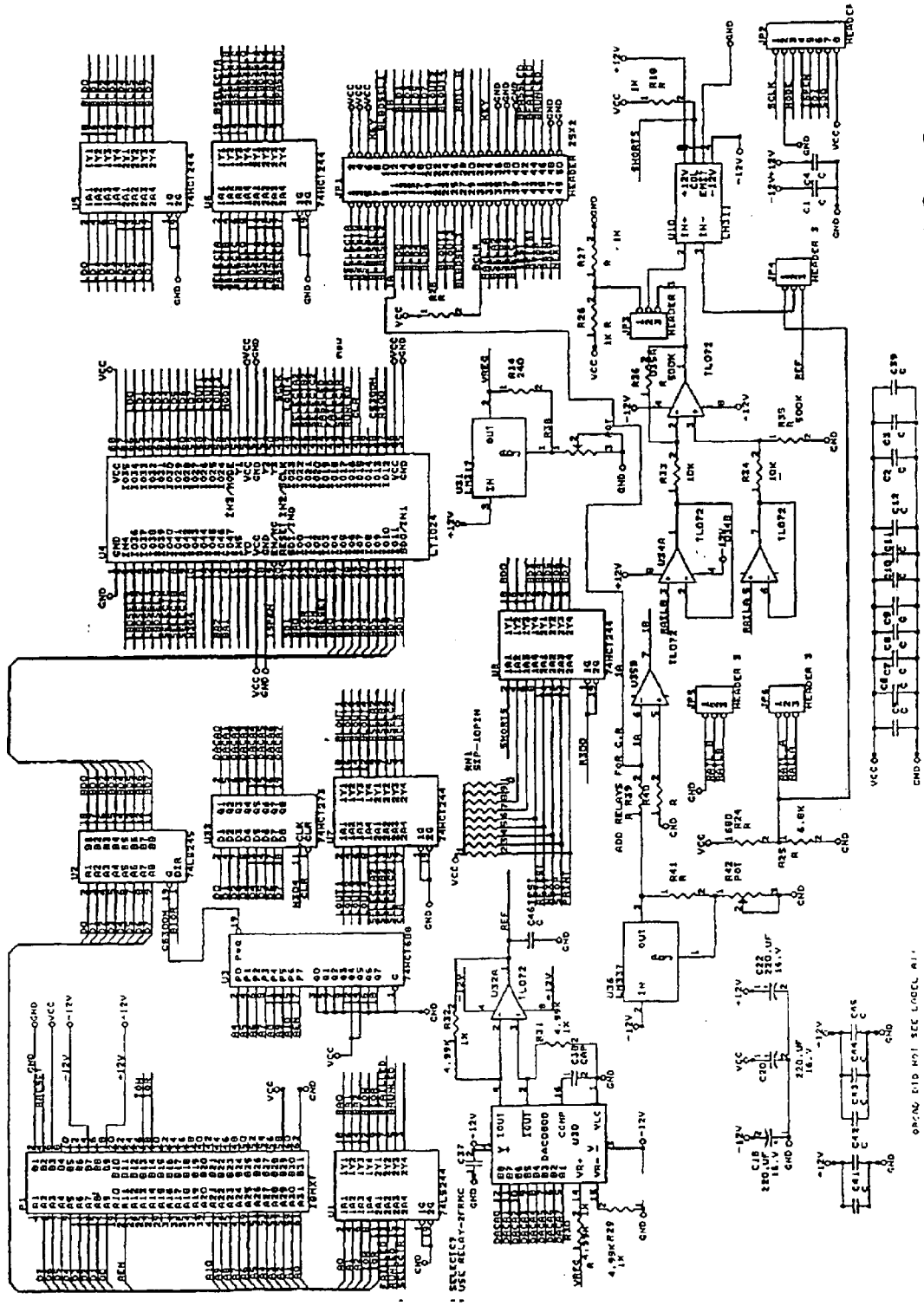
FIG. 3 is a diagram of the electronic circuitry of the preferred embodiment.

Reference is made to FIG. 3 for a description of the electronic components of part of the system of the present invention.

P1 is the IBM ISA bus connector.

U4 provides signals which make selections at the multiplexer/driver card.

UI, U2, U5, U6, U7, and U33 are buffers and registers for bus and selection signals.

U31 and U36 are voltage regulators which provide a reference voltage to the DAC U30.

U35 is a constant current source which is applied to the multiplexers at the multiplexer/driver card. This is the actual current source which is applied to the wires under test.

U34 and U35 are differential amplifiers which amplify the signal from the multiplexer/driver card.

U10 compares the level of the amplified signal from the multiplexer/driver card to a reference voltage from DAC U30 (Digital to Analog Converter), and makes decision if the wires under test are shorted or opened. The output of the comparator U10 is connected to the computer bus to register the result to a computer file.

The Multiplexer/Driver Card

The multiplexer/driver card connects to the wire harness under test via multiple connector modules located on top panel of the system connector unit. Each connector can connect up to 32 wires. If the harness under test requires more than 32 contacts per connector, multiple connector modules may be combined and form a larger connector. As an example, two combined connector modules will have 64 pins. The software recognizes the combined connector modules and assigns them the right number of pins.

Figure 4:
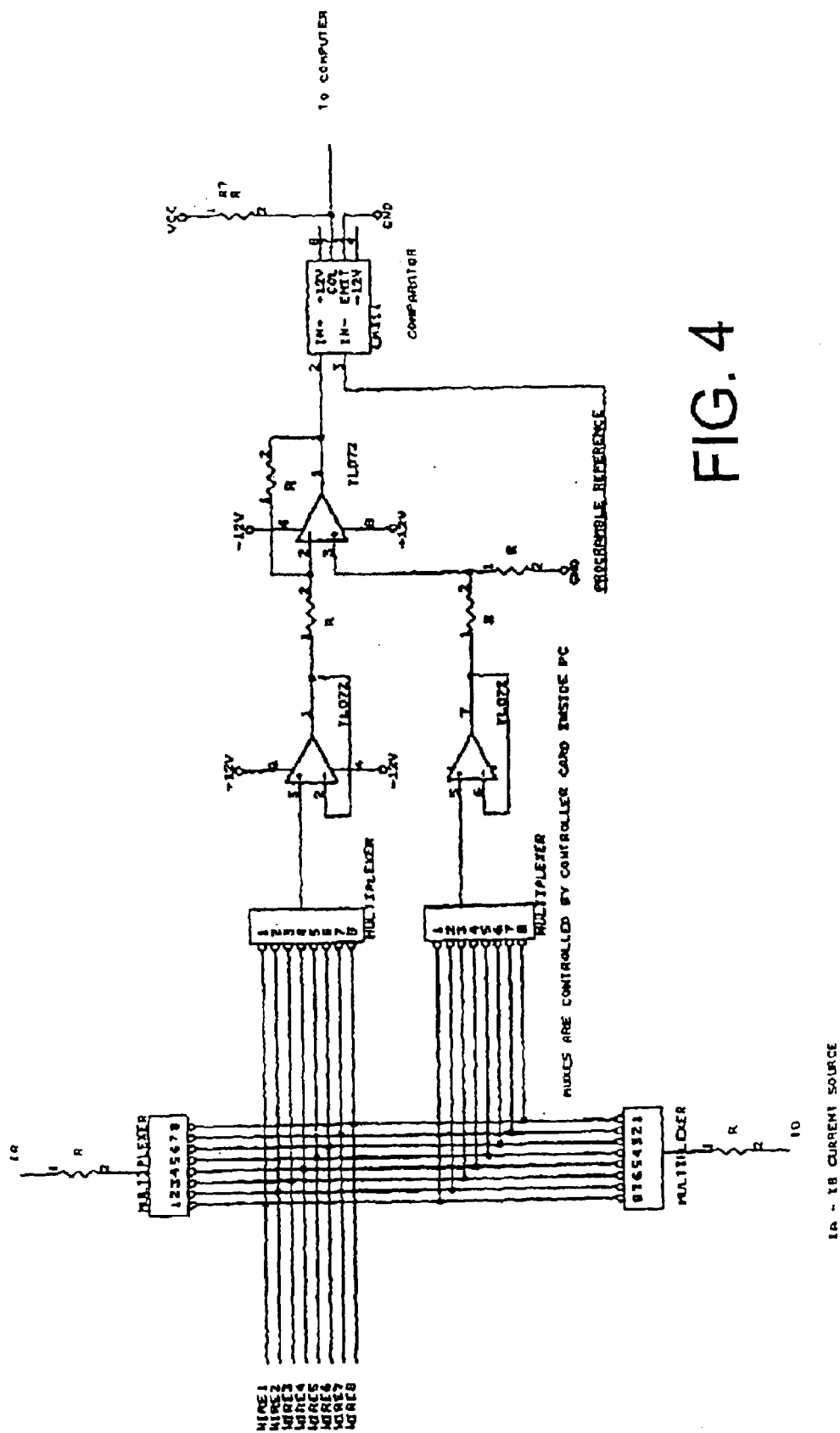
FIG. 4 is a diagram of the electronic circuitry of the basic sensor of the preferred embodiment.

The hardware of the multiplexer/driver card consist of control logic components U17, U18, U38 and U39 which steer the signals from the Controller Card to the selected pair of wires under test. U1–U16, U21–U36 are multiplexer IC's, which are connected to the wire harness under test. These IC's are arranged in 2 groups as shown in FIGS. 3 and 4: Rail A and Rail B. Two multiplexer/driver cards are needed for every 128 points. One card provides the stimulus for the selected 2 wires (between Rail A and Rail B). The other card senses the signals (between Rail A And Rail B) and sends them to the controller card for evaluation.

Insulation Testing

The system of the present invention, using the same basic hardware components, further provides a means for determining the integrity of the wiring harness insulation by detecting leakage in aircraft wiring, caused by faulty insulation and testing the strength of the wiring insulation.

Faulty insulation, caused by aging or chafing, may cause the discharge of sparks and arcing between conductor to conductor or conductor to frame. When a cable harness is tested, the system of the present invention measures the leakage current between each conductor to aircraft structure and to the other conductors by measuring a leakage current and providing results in magnitude of gigaOhms.

Typically the test is conducted in two steps:

First, a low voltage source of 10VDC is used to determine low voltage leakage between any wire to aircraft structure and to the rest of the wires. A threshold can be set such that wires with less than, for example, 2 or 5 gigaOhms will be reported.

The second step, allows testing the wires not reported as failing in the first step, to be tested under higher voltage, typically 500VDC (the voltage is programmable, and so is the duration). Also in this step a threshold can be set such that wires with less than, for example, 20 gigaOhms will be reported. The higher voltage, detects weak insulation and can measure higher values of leakage/resistance than the previous step.

In the disclosed configuration, the system of the present invention may connect to 512 points, in which only the first 64 can test for high voltage. In addition, there are safety features alerting the user to the higher voltage while testing in high voltage mode. In addition to software controlled switching, a manual cut off switch is also installed in the system. The design of the system, however, allows for increasing the number of points if required.

In addition the system of the present invention incorporates a resistivity measurement capability to supplement the wire validation process. In a resistivity testing mode the user can select a resistance value. Then all wires with resistance above the specified value will register as faulty during test.

Alternately, the user can select two limits for resistance values: an upper limit and a lower limit. Wires with resistance outside these limits will register as faulty during test.

Further selectable components of the hardware of the present invention, components and functions which are known in the art, provide the following additional features:

Low Voltage Leakage: The user can select a high resistance value, for example 1000 Mega Ohm. The tester uses low voltage of about 10VDC to make the measurements. All wires with resistance above the specified value will register as faulty during test.

High Voltage Leakage: The user can select a high resistance value, example 5000 Mega Ohm. The tester uses high voltage, programmable by user, for example 1–500VDC to make the measurements. All wires with resistance above the specified value will register as faulty during test. The user can also specify the duration of the present of the high voltage from 1 to 60 seconds. In addition, the hardware and the software ensure that a high voltage leakage test can be performed only on wires which did not fail the low voltage leakage test. The presence of the high voltage is controlled by software and hardware. At any time the user can cut off the voltage using a switch located on the front panel of the tester.

Using a high voltage is also necessary to check the strength of the insulation. Weak insulation will show a lower than normal resistance between the faulty wires.

Create Drawings Function: This function commands the tester function of the present invention to capture and store all the interconnections of all wires connected to the system. The system then translates the captured data to drawings. The software can generate files in AutoCad® format or in different formats for CAD/CAM, etc. The software assigns one or more pages to the drawings, based on the number of connectors and number of wires involved. If several pages are involved, and a wire connects to a connector on a different page, the software adds a label to the wire with the target page number.

Edit functions: The user can edit the name of each wire, and can select individual wires to be tested, by checking the check boxes next to each wire.

The software system for generating wiring diagrams is an object oriented system and addresses the following objects:

Schematic (Object)
  Comprises a collection of pages
  Comprises a collection of connections
  Comprises a collection of connectors
  Can assign connectors to pages
  Can generate files in different formats (for CAD/CAM, etc.)
Page (Object)
  Comprises one or more connectors.
  Can respond to a connector request to draw itself by drawing the connector
  Can respond to a connector request to draw a connection (to another connector or to the edge of the page (with a label))
Connector (Object)
  Knows its size (number of pins), its page, and its page location
  Can ask his page to draw itself
  Can ask his page to draw a connection from one of his pins to another connector
Connection (Object)
  Knows its two connectors and pin numbers
  Can ask its connectors for their pages
  Can ask one of its connector to draw the entire connection (if both connectors are on the same page)
  Can ask each of its connectors to draw part of the connection (if both connectors are not on the same page)

The process carried out by the system in order to create a usable wiring diagram, in conjunction with standard CAD/CAM software packages, is as follows:

1. The Schematic object analyzes the number and size of its connectors collection, creates the appropriate number of pages, and assigns each page one or more connectors.
2. The Schematic object iterates through it connectors collection and tells each connector to draw itself, and in turn, each connector tells its page to draw the connector.
3. The Schematic object iterates through its connections collection and tells each connection to draw itself. Each connection in turns check if both ends of the connection are on the same page or not.

If the page is the same, the connection asks one of the connectors to draw the connections. The connector in turn, asks its page to draw the connection. If the page is not the same, the connection asks each of the connectors to draw its portion of the connection. The connector in turn, asks its page to draw its part of the connection.

Figure 6:
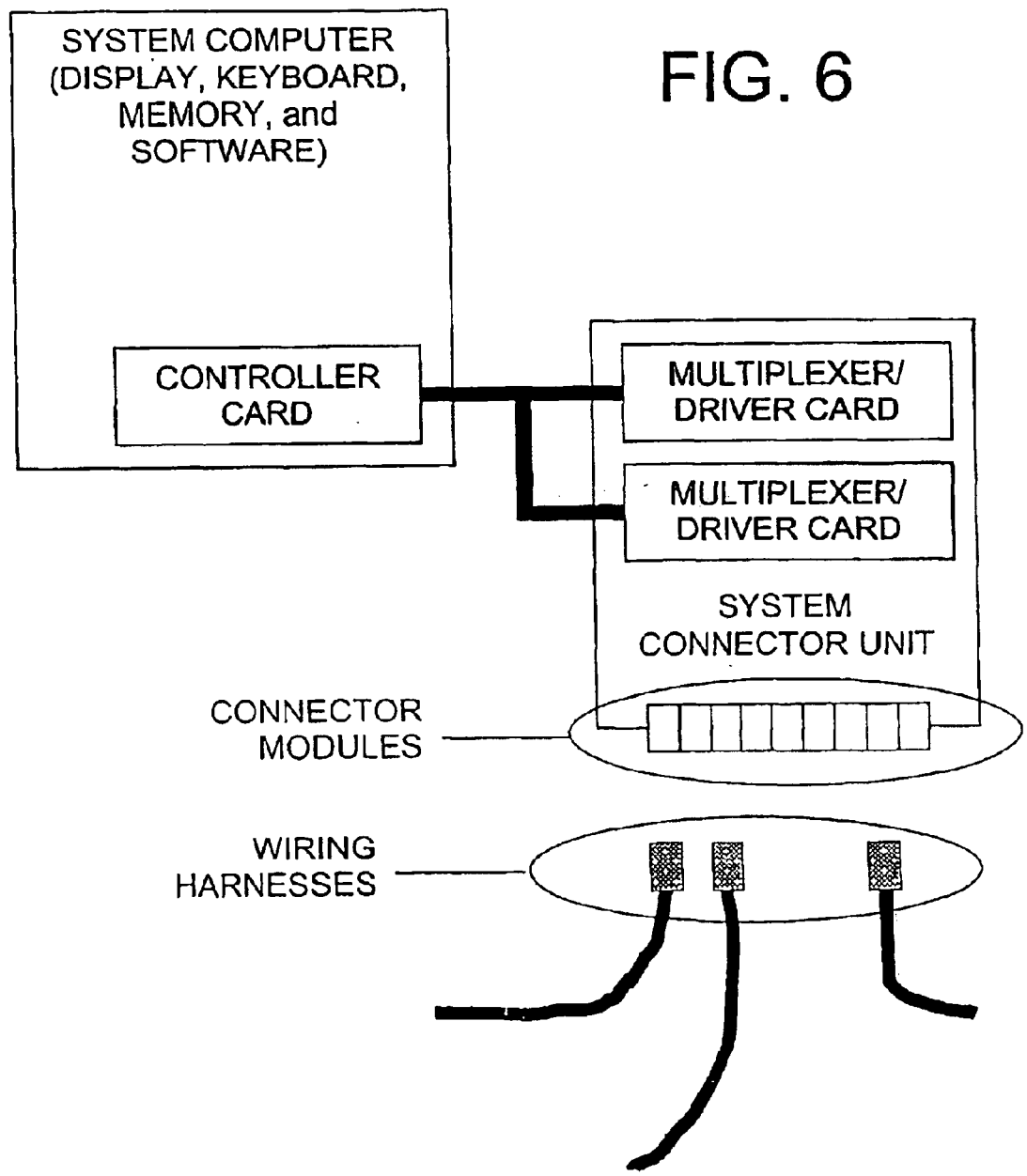
FIG. 6 is a schematic block diagram showing the arrangement and function of the various hardware components of the present invention.

The hardware components of the present invention are shown in schematic block diagram form in FIG. 6. This view clarifies the arrangement where the controller card, incorporated within the system computer, is linked to and controls the operation of the multiplexer/driver cards which are positioned within the system connector unit. The multiplexer/driver cards are in turn connected to the connector modules on the connector unit in the manner described above. The wiring harnesses under test are then connected to the connector modules as shown.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. An apparatus for validating a wiring diagram, creating a wire list, and generating a new wiring diagram for a wiring harness comprising:
   a. a computer having a controller card connected to the computer bus,
   b. a display unit having a multiplexer card,
   c. at least one multiple wire connector module electronically connected to said multiplexer card,
   d. said controller card controlling said multiplexer card,
   e. a software system installed on said computer,
   f. said software system being capable of directing a sequential testing of said wiring harness and storing the results thereof,
   g. said software system being capable of generating written reports in the form of wire lists and tables of wiring harness characteristics, and
   h. said software system being capable of generating new wiring diagrams based upon the results of said testing.

2. The invention of claim 1, wherein said connector module has at least one wire.

3. The invention of claim 2, wherein said software system is capable of interfacing with computer aided drawing software to generate said new wiring diagrams.

4. The invention of claim 2, wherein said apparatus has a first connector module and a second connector module, and said first connector module and said second connector module are electronically combined into a single connector module.

5. The invention of claim 4, wherein said software system is capable of interfacing with computer aided drawing software to generate said new wiring diagrams.

6. The invention of claim 1, wherein said software system is capable of interfacing with computer aided drawing software to generate said new wiring diagrams.

7. A process for creating a wire list and a new wiring diagram for a wiring harness comprising the steps of:
   a. a controller in a computer sending a command to a multiplexer card to select two wires,
   b. said multiplexer card sending a voltage at low current through the two wires,
   c. said multiplexer card measuring the value of the voltage level between the two wires and sending said value to said computer,
   d. said computer comparing said value of the voltage level to a set reference and determining the status of the selected wires as being open or short, e. said computer storing the status of the selected two wires and said controller proceeding with the next set of wires as in Step a., f. once all sets of wires are tested as in Steps a.–e., a software system installed on said computer generating a wire list of all wires found to be connected to each other, and g. said software system generating a new wiring diagram based upon the stored results from all sets of wires.

8. The invention as in claim 7, wherein the process further comprises the step of said software system interfacing with computer aided drawing software to generate said new wiring diagram.

9. A process for validating a wiring diagram manual contained in a software database and creating a new wiring diagram for a wiring harness comprising the steps of:

a. copying an original wiring diagram manual database to a temporary file, b. sorting said temporary file by connector name with the highest pin count pins within the connectors sorted in ascending order, c. assigning original pin indentifications within the connector to system pin identifications, d. assigning modules to said connectors, e. if any of said connectors has more than 32 pins, combining said modules for those connectors, f. creating an interface diagram of original pin indentifications with their assigned system pin identifications, g. creating a test learn file format record and saving said record to a random access file, h. running a test, i. creating an actual wire list database in a compatible format as said original wiring diagram manual database, said actual wire list database containing the wire list resulting from said test, j. comparing said actual wire list database to said original wiring diagram manual database, k. if differences between said original wiring diagram manual database and said actual wire list database are identified, displaying the differences between said original wiring diagram database and said actual wire list database, and l. generating a new wiring diagram from said actual wire list database based upon the results of said test.

10. The invention as in claim 9, wherein the process further comprises the step of interfacing with computer aided drawing software to generate said new wiring diagram.

11. A process for determining the integrity of wiring insulation and creating a new wiring diagram for a wiring harness comprising the steps of:

a. applying a low voltage source of approximately 10VDC to all wires in a wiring harness to determine low voltage leakage, b. measuring leakage current between wires and between each wire to aircraft structure and providing results in magnitude of gigaOhms, c. analyzing results to identify wires failing due to low voltage leakage, d. applying a higher voltage source of approximately 500VDC to all wires not identified as failing due to low voltage leakage, e. measuring leakage current between wires and between each wire to aircraft structure and providing results in magnitude of gigaOhms, f. analyzing results to identify wires failing due to high voltage leakage, g. capturing and storing all the interconnections of wires connected to said wiring harness, and h. translating captured data to generate a new wiring diagram.

12. The invention as in claim 11, wherein the process further comprises the step of interfacing with computer aided drawing software to generate said new wiring diagram.

* * * * *